United States Patent
Prissok et al.

(10) Patent No.: US 10,611,872 B2
(45) Date of Patent: Apr. 7, 2020

(54) METHODS FOR PRODUCING TRANSPARENT, THERMOPLASTIC POLYURETHANE HAVING HIGH MECHANICAL STRENGTH AND HARDNESS

(71) Applicant: BASF SE, Ludwigshafen (DE)

(72) Inventors: Frank Prissok, Lemfoerde (DE); Sebastian Hartwig, Muenster (DE); Stefan Bokern, Bremen (DE); Julia Liese, Bremen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/034,116

(22) PCT Filed: Oct. 28, 2014

(86) PCT No.: PCT/EP2014/073078
§ 371 (c)(1),
(2) Date: May 3, 2016

(87) PCT Pub. No.: WO2015/063062
PCT Pub. Date: May 7, 2015

(65) Prior Publication Data
US 2016/0304659 A1 Oct. 20, 2016

(30) Foreign Application Priority Data
Nov. 4, 2013 (EP) .................................. 13191374

(51) Int. Cl.
| | | |
|---|---|---|
| *C08G 18/48* | (2006.01) | |
| *C08G 18/75* | (2006.01) | |
| *C08G 18/08* | (2006.01) | |
| *C08G 18/24* | (2006.01) | |
| *C08G 18/66* | (2006.01) | |
| *C08G 18/22* | (2006.01) | |
| *C09D 175/04* | (2006.01) | |
| *C08G 75/04* | (2016.01) | |
| *C08L 75/04* | (2006.01) | |
| *C08G 18/40* | (2006.01) | |

(52) U.S. Cl.
CPC ..... *C08G 18/4879* (2013.01); *C08G 18/0895* (2013.01); *C08G 18/227* (2013.01); *C08G 18/244* (2013.01); *C08G 18/4018* (2013.01); *C08G 18/4808* (2013.01); *C08G 18/4816* (2013.01); *C08G 18/4829* (2013.01); *C08G 18/6674* (2013.01); *C08G 18/758* (2013.01); *C08L 75/04* (2013.01); *C09D 175/04* (2013.01); *C08L 2201/10* (2013.01)

(58) Field of Classification Search
CPC ............ C08G 18/4879; C08G 18/4829; C08G 18/4816; C08G 18/4018; C08G 18/227; C08G 18/6674; C08G 18/4808; C08G 18/0895; C08G 18/758; C08G 18/244; C09D 175/04; C08L 2201/10; C08L 75/04

See application file for complete search history.

(56) References Cited

U.S. PATENT DOCUMENTS

| | | | |
|---|---|---|---|
| 3,321,549 A | * | 5/1967 | Barth ................. C08G 18/4045 156/330 |
| 4,990,545 A | | 2/1991 | Hourai et al. |
| 2007/0191544 A1 | | 8/2007 | Jaffrennou et al. |
| 2011/0281965 A1 | | 11/2011 | Laas et al. |

FOREIGN PATENT DOCUMENTS

| | | |
|---|---|---|
| EP | 0 358 406 A2 | 3/1990 |
| EP | 0780413 A1 * | 6/1997 |
| EP | 1 394 189 A1 | 3/2004 |
| EP | 1 674 494 A1 | 6/2006 |
| EP | 1 810 983 A1 | 7/2007 |
| JP | 2006-321950 A | 11/2006 |

OTHER PUBLICATIONS

L. Abele, et al., "Polyurethane", Kunststoff Handbuch, vol. 7, 3$^{rd}$ Edition, 1993, 20 pages.
W. Altner, et al., "Polyurethane", Kunststoff-Handbuch, vol. 7, Herstellung, Eigenschaften, Verarbeitung und Anwendung, Carl Hanser Verlag Munchen, 1966, 12 pages.
International Search Report dated Dec. 5, 2014 in PCT/EP14/73078 Filed Oct. 28, 2014.

* cited by examiner

*Primary Examiner* — Rabon A Sergent
(74) *Attorney, Agent, or Firm* — Oblon, McClelland, Maier & Neustadt, L.L.P.

(57) ABSTRACT

The present invention relates to thermoplastic polyurethanes obtainable or obtained by reaction of at least one aliphatic polyisocyanate; at least one chain extender; and at least one polyol composition, where the polyol composition comprises a polyol selected from the group consisting of polyetherols and at least one bisphenol derivative selected from the group consisting of bisphenol A derivatives with a molecular weight Mw>315 g/mol and bisphenol S derivatives with a molecular weight Mw>315 g/mol, where at least one of the OH groups of the bisphenol derivative is alkoxylated, and to processes for producing such thermoplastic polyurethanes and to the use of a thermoplastic polyurethane according to the invention for producing extrusion products, films and moldings.

15 Claims, No Drawings

METHODS FOR PRODUCING TRANSPARENT, THERMOPLASTIC POLYURETHANE HAVING HIGH MECHANICAL STRENGTH AND HARDNESS

The present invention relates to thermoplastic polyurethanes obtainable or obtained by reaction of at least one aliphatic polyisocyanate, at least one chain extender, and at least one polyol composition, where the polyol composition comprises a polyol selected from the group consisting of polyetherols and at least one bisphenol derivative selected from the group consisting of bisphenol A derivatives with a molecular weight Mw>315 g/mol and bisphenol S derivatives with a molecular weight Mw>315 g/mol, where at least one of the OH groups of the bisphenol derivative is alkoxylated, and to processes for producing such thermoplastic polyurethanes and to the use of a thermoplastic polyurethane according to the invention for producing extrusion products, films and moldings.

Thermoplastic polyurethanes for various applications are fundamentally known from the prior art. Different property profiles can be obtained by varying the feed materials.

Thus, thermoplastic polyurethanes (TPU) based on aromatic isocyanates exhibit good mechanical properties and can be readily processed. One reason for this is the partial crystallinity present in the thermoplastic polyurethane. However, they have decisive disadvantages: they are not lightfast and discolor rapidly in the case of outdoor applications, in the heat or upon UV irradiation; their transparency does not suffice for applications in which thick-walled parts are produced, or for applications in the light guide sector.

Thermoplastic polyurethanes based on aliphatic isocyanates have good lightfastness, but on account of the lack of crystallinity can only be processed with difficulty and, in contrast to aromatic TPU, have only low mechanical strength and hardness. In the case of aliphatic HDI (hexamethylene diisocyanate)-based systems, these have rather poorer crystallinity and processability.

The prior art describes various approaches for improving the property profiles of thermoplastic polyurethanes.

EP 1 674 494 describes a sinterable aliphatic thermoplastic polyurethane, where also the possible use of bisphenol A bis(2-hydroxyethyl) as chain extender in combination with a polyol with a molecular weight between 450 g/mol and 10 000 g/mol is mentioned. This molecule is unadvantageously a solid with high melt viscosity at room temperature, which hinders processing. The influence on lightfastness and mechanical properties is not described.

EP 1 394 189 describes flameproofed thermoplastic polyurethanes producible from aliphatic diisocyanates, a polyol with a molecular weight between 450 g/mol and 10 000 g/mol, at least one organic phosphorus-containing compound based on a phosphonate and/or phosphine oxide and a chain extender, which may also be 1,4-di(g-hydroxyethyl) bisphenol A. The focus of this application is directed to the self-extinguishing properties of the thermoplastic polyurethane.

Also EP 0 358 406 A2 discloses thermoplastic polyurethanes, which can also comprise bisphenol derivatives which, applied as a thin protective layer or coating via solvents, can exhibit self-healing properties.

US 2011/0281965 mentions the use of the chain extender 4,4'-dioxethoxydiphenyldimethyl-methane as reaction product of bisphenol A and 2 mol of ethylene oxide in the production of polyurethanes on an aliphatic basis for optical applications in polyurethane casting elastomer systems with disadvantages discussed above.

JP 2006321950A describes the use of alkoxylated bisphenol A components in casting elastomer applications with focus on HDI trimers as isocyanates. These materials are not suitable for thermoplastic processing. Moreover, examples mentioned are exclusively alkoxyated bisphenol A components solid at room temperature.

Hitherto it has therefore not been possible to an adequate extent to provide thermoplastic polyurethanes which have very good mechanical properties and at the same time a lightfastness sufficient for practical applications.

Proceeding from the prior art, an object of the present invention was therefore to provide thermoplastic polyurethanes and processes for producing thermoplastic polyurethanes, the starting compounds of which can be processed sufficiently readily and which have firstly high transparency and lightfastness and secondly very good mechanical strength and hardness.

According to the invention, this object is achieved by a thermoplastic polyurethane obtainable or obtained by reaction of at least the components (i) to (iii):
(i) at least one aliphatic polyisocyanate;
(ii) at least one chain extender; and
(iii) at least one polyol composition,
where the polyol composition comprises
a polyol selected from the group consisting of polyetherols and
at least one bisphenol derivative selected from the group consisting of bisphenol A derivatives with a molecular weight Mw>315 g/mol and bisphenol S derivatives with a molecular weight Mw>315 g/mol, where at least one of the OH groups of the bisphenol derivative is alkoxylated.

Surprisingly, it has been found that the incorporation of bisphenol derivatives into the polymer structure, despite their aromatic structure, not only does not impair the lightfastness of aliphatic thermoplastic polyurethanes. Rather, they can be used to produce a hard thermoplastic polyurethane of highest transparency and lightfastness. Surprisingly, discoloration also does not result upon long UV irradiation and thermal stress.

It has been found that transparent thermoplastic polyurethanes can be obtained if, for the production, besides at least one polyisocyanate and at least one chain extender, at least one polyol composition is used which comprises a polyol selected from the group consisting of polyetherols and at least one bisphenol derivative selected from the group consisting of bisphenol A derivatives with a molecular weight Mw>315 g/mol and bisphenol S derivatives with a molecular weight Mw>315 g/mol, where at least one of the OH groups of the bisphenol derivative is alkoxylated.

By virtue of the polyol composition used according to the invention, i.e. the combination of a polyol selected from the group consisting of polyetherols and the above-described at least one bisphenol derivative, thermoplastic polyurethanes are obtained which have firstly good mechanical properties, and secondly high transparency and lightfastness.

In the context of the present invention, it is essential that at least one chain extender and the polyol composition are used as described above. In this connection, the polyol composition can comprise further polyols besides the at least one bisphenol derivative. Accordingly, in the context of the present invention, it is also possible to use at least one chain extender and a polyol composition comprising at least one bisphenol A derivatives as described above and at least one further polyol.

According to the invention, it is possible to use one chain extender, although it is also possible to use mixtures of different chain extenders.

The chain extenders used can be preferably aliphatic, araliphatic, aromatic and/or cycloaliphatic diols with a molecular weight of 50 g/mol to 220 g/mol. Preference is given to alkanediols having 2 to 10 carbon atoms in the alkylene radical, in particular di-, tri-, tetra-, penta-, hexa-, hepta-, octa-, nona- and/or decaalkylene glycols. For the present invention, particular preference is given to 1,2-ethylene glycol, 1,3-propanediol, 1,4-butanediol, 1,6-hexanediol.

Preferably, the chain extender is a diol with a molecular weight Mw<220 g/mol. According to the invention, it is possible that only one diol with a molecular weight Mw<220 g/mol is used for producing the transparent, thermoplastic polyurethane.

According to a further embodiment, more than one diol is used as chain extender. It is thus also possible to use mixtures of chain extenders, where at least one diol has a molecular weight Mw<220 g/mol. If more than one chain extender is used, then the second or further chain extender can also have a molecular weight ≥220 g/mol.

According to a further embodiment, the chain extender is selected from the group consisting of 1,4-butanediol and 1,6-hexanediol.

Accordingly, the present invention relates, according to a further embodiment, to a thermoplastic polyurethane as described above, where the chain extender is a diol with a molecular weight Mw<220 g/mol.

The chain extender, in particular the diol with a molecular weight Mw<220 g/mol, is preferably used in a molar ratio in the range from 40:1 to 1:10 to the bisphenol derivative. Preferably, the chain extender and the bisphenol derivative are used in a molar ratio in the range from 20:1 to 1:9, further preferably in the range from 10:1 to 1:8.5, for example in the range from 5:1 to 1:5, or else in the range from 4:1 to 1:1, further preferably in the range from 3:1 to 2:1.

Accordingly, the present invention relates, according to a further embodiment, to a thermoplastic polyurethane as described above, where the chain extender and the bisphenol derivative are used in a molar ratio of 40:1 to 1:10.

According to the invention, the polyol composition comprises at least one bisphenol derivative selected from the group consisting of bisphenol A derivatives with a molecular weight Mw>315 g/mol and bisphenol S derivatives with a molecular weight Mw>315 g/mol, where at least one of the OH groups of the bisphenol derivative is alkoxylated. According to the invention, it is also possible that the polyol composition comprises two or more bisphenol derivatives selected from the group consisting of bisphenol A derivatives with a molecular weight Mw>315 g/mol and bisphenol S derivatives with a molecular weight Mw>315 g/mol, where at least one of the OH groups of the bisphenol derivative is alkoxylated.

According to one preferred embodiment of the present invention, the at least one bisphenol derivative has only primary OH groups. Thus, according to this embodiment, the at least one bisphenol derivative has no phenolic or aromatic OH groups.

According to the invention, at least one of the OH groups of the bisphenol derivative is alkoxylated. According to a preferred embodiment of the present invention, both OH groups of the bisphenol derivative are alkoxylated. Surprisingly, it has been found that by virtue of the combination according to the invention of polyols and/or the use of bisphenol derivatives in which at least one of the OH groups is alkoxylated, preferably both OH groups are alkoxylated, and in which preferably therefore no aromatic OH groups are present, excellent mechanical properties of the resulting thermoplastic polyurethane are obtained.

According to a further embodiment of the present invention, both OH groups of the bisphenol derivative are alkoxylated. Alkoxylated according to the present invention means that an alkoxyl group (—O—R— where R=alkylene radical) is incorporated into the chemical bond between aromatic ring of the bisphenol derivative and the hydroxyl group (—OH). According to one embodiment, the two OH groups on the bisphenol derivative here are alkoxylated with the same alkoxyl group. In this connection, for example, it is possible that the OH groups are alkoxylated with ethoxyl (—O—$C_2H_4$—), propoxyl (—O—$C_3H_6$—), butoxyl (—O—$C_4H_8$—), pentoxyl (—O—$C_5H_{10}$—) or hexoxyl groups (—O—$C_6H_{12}$—).

According to a further embodiment of the present invention, both OH groups of the bisphenol derivative are alkoxylated with different alkoxy groups (—O—R— where R=alkylene radical). According to a preferred embodiment, the two OH groups of the bisphenol derivative are alkoxylated with two different radicals selected from the group consisting of ethoxyl (—O—$C_2H_4$—), propoxyl (—O—$C_3H_6$—), butoxyl (—O—$C_4H_8$—), pentoxyl (—O—$C_5H_{10}$—) or hexoxyl radical (—O—$C_6H_{12}$—).

According to the invention, the alkoxyl radical can have one or else more alkoy groups. According to a preferred embodiment of the present invention, a bisphenol derivative is used where at least one of the OH groups of the bisphenol derivative is alkoxylated, and the at least one alkoxyl radical has a molecular weight of >40 g/mol, preferably >60 g/mol, further preferably >120 g/mol, in particular >180 g/mol, for example >250 g/mol, or else >300 g/mol.

According to a further preferred embodiment of the present invention, a bisphenol derivative is used where both OH groups of the bisphenol derivative are alkoxylated and the two alkoxyl radicals can be identical or different and, independently of one another, have a molecular weight of >40 g/mol, preferably >60 g/mol, further preferably >120 g/mol, in particular >180 g/mol, for example >250 g/mol, or else >300 g/mol.

According to the invention, the bisphenol derivative is selected from the group consisting of bisphenol A derivatives with a molecular weight Mw>315 g/mol and bisphenol S derivatives with a molecular weight Mw>315 g/mol, where at least one of the OH groups of the bisphenol derivative is alkoxylated. Further, preference is given to bisphenol A derivatives or bisphenol S derivatives with a molecular weight Mw>400 g/mol, further preferably a molecular weight Mw>450 g/mol, in particular a molecular weight Mw>500 g/mol, particularly preferably a molecular weight Mw>550 g/mol, for example a molecular weight Mw>600 g/mol.

According to one embodiment, the present invention relates to a thermoplastic polyurethane as described above, where the at least one bisphenol derivative has only primary OH groups.

In this connection, the present invention relates, according to a further embodiment, to a thermoplastic polyurethane as described above, where the at least one bisphenol derivative has the following general formula (I):

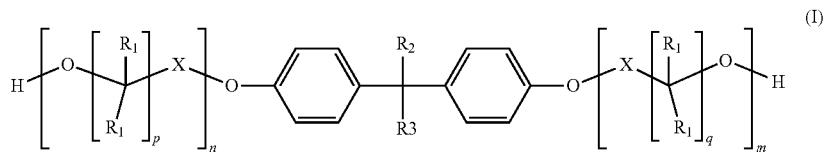

where
R1 is in each case independently of the others a methyl group or H,
R2 and R3 are a methyl group or
R2—C—R3 together are O=S=O,
X is a —C(R1)$_2$—, —C(R1)$_2$—C(R1)$_2$— or —C(R1)$_2$—C(R1)$_2$—C(R1)$_2$— group,
p and q independently of one another are an integer from 1 to 4, and
n and m independently of one another are an integer >0.

Accordingly, the bisphenol derivative can have the formula (Ia), where R2 and R3 are a methyl group, or (Ib), where R2—C—R3 together are O=S=O:

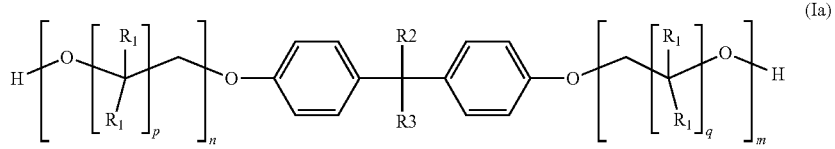

(Ia)

where
R1 is in each case independently of the others a methyl group or H.
R2 and R3 are a methyl group,
X is a —C(R1)$_2$—, —C(R1)$_2$—C(R1)$_2$— or —C(R1)$_2$—C(R1)$_2$—C(R1)$_2$— group,
p and q independently of one another are an integer from 1 to 4, and
n and m independently of one another are an integer >0;
or

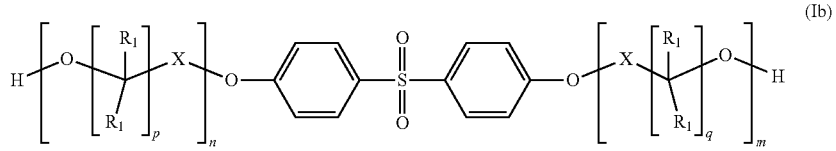

(Ib)

where
R1 is in each case independently of the others a methyl group or H.
R2—C—R3 together are O=S=O,
X is a —C(R1)$_2$—, —C(R1)$_2$—C(R1)$_2$— or —C(R1)$_2$—C(R1)$_2$—C(R1)$_2$— group,
p and q independently of one another are an integer from 1 to 4, and
n and m independently of one another are an integer >0.

According to a preferred embodiment, the alkoxyl radical is in each case an ethoxyl radical, i.e. according to a preferred embodiment, the at least one bisphenol derivative has the general formula (II):

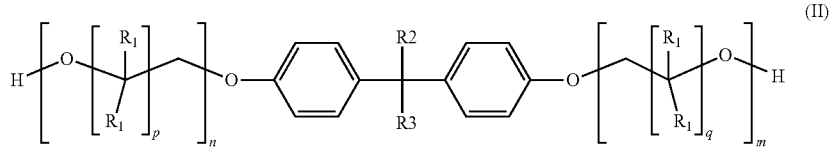

(II)

where
R1 is in each case independently of the others a methyl group or H,
R2 and R3 are a methyl group or
R2—C—R3 together are O=S=O,
p and q independently of one another are an integer from 1 to 4, and
n and m independently of one another are an integer >0.

According to a preferred embodiment, R1 is hydrogen, i.e. the compound of the formula (I) or (Ia), (Ib) or (II) preferably has primary alcohol groups in the terminal position.

Besides the at least one bisphenol derivative, the polyol composition can comprise further polyols in accordance with the invention.

Polyols are known in principle to the person skilled in the art and described, for example, in the "Plastics Handbook, volume 7, Polyurethanes", Carl Hanser Verlag, 3rd edition 1993, chapter 3.1. Particular preference is given to using polyesterols or polyetherols as polyols. It is likewise possible to use polycarbonates. In the context of the present invention, it is also possible to use copolymers. The number-average molecular weight of the polyols used according to the invention are preferably between $0.5 \times 10^3$ g/mol and $8 \times 10^3$ g/mol, preferably between $0.6 \times 10^3$ g/mol and $5 \times 10^3$ g/mol, in particular between $0.8 \times 10^3$ g/mol and $3 \times 10^3$ g/mol.

Accordingly, the present invention relates, according to a further embodiment, to a thermoplastic polyurethane as described above, where the polyol composition comprises a polyol selected from the group consisting of polyetherols.

According to the invention, preferred polyetherols are polyethylene glycols, polypropylene glycols and polytetrahydrofurans.

According to a particularly preferred embodiment, the polyol is a polytetrahydrofuran with a molecular weight in the Mn range from 600 g/mol to 2500 g/mol.

Accordingly, the present invention relates, according to a further embodiment, to a thermoplastic polyurethane as described above, where the polyol composition comprises a polyol selected from the group consisting of polytetrahydrofurans with a molecular weight Mn in the range from 600 g/mol to 2500 g/mol.

Preferably, the polyols used have an average functionality between 1.8 and 2.3, preferably between 1.9 and 2.2, in particular 2. Preferably, the polyols used according to the invention have only primary hydroxyl groups.

According to the invention, the polyol can be used in pure form or in the form of a composition comprising the polyol and at least one solvent. Suitable solvents are known per se to the person skilled in the art.

The additional polyol is preferably used in a molar ratio in the range from 40:1 to 1:10 to the bisphenol derivative. In further preferred embodiments, the polyol and the bisphenol derivative are used in a molar ratio in the range from 30:1 to 1:9, further preferably in the range from 20:1 to 1:8.5, in particular in the range from 15:1 to 1:5, particularly preferably in the range from 10:1 to 1:2, or else in the range from 7:1 to 1:1.6.

According to the invention, the polyol selected from the group consisting of polyetherols can be used in a molar ratio in the range from 40:1 to 1:10 to the bisphenol derivative. In further preferred embodiments, the polyol selected from the group consisting of polyetherols and the bisphenol derivative are used in a molar ratio in the range from 30:1 to 1:9, further preferably in the range from 20:1 to 1:8.5, in particular in the range from 15:1 to 1:5, particularly preferably in the range from 10:1 to 1:2, or else in the range from 7:1 to 1:1.6.

For example, the polyol and the bisphenol derivative can be used in a ratio in the range from 40:1 to 10:1, in particular in the range from 30:1 to 15:1. It is likewise possible that the polyol and the bisphenol derivative are used in a ratio in the range from 1:10 to 1:9.

According to the invention, at least one polyisocyanate is used. According to the invention, it is also possible to use mixtures of two or more polyisocyanates.

In the context of the present invention, preferred polyisocyanates are diisocyanates, in particular aliphatic diisocyanates.

Accordingly, the present invention relates, according to a further embodiment, to a thermoplastic polyurethane as described above, where the polyisocyanate is an aliphatic diisocyanate.

Furthermore, in the context of the present invention prereacted prepolymers can be used as isocyanate components, in which some of the OH components are reacted with an isocyanate in an upstream reaction step. These prepolymers are reacted in a subsequent step, the actual polymer reaction, with the remaining OH components and then form the thermoplastic polyurethane. The use of prepolymers offers the possibility of also using OH components with secondary alcohol groups.

The aliphatic diisocyanates used are customary aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,4-cyclohexane diisocyanate, 1-methyl-2,4- and/or 1-methyl-2,6-cyclohexane diisocyanate, 4,4'-, 2,4'- and/or 2,2'-methylenedicyclohexyl diisocyanate (H12MDI).

Preferred aliphatic polyisocyanates are hexamethylene 1,6-diisocyanate (HDI), 1-isocyanato-3,3,5-trimethyl-5-isocyanatomethylcyclohexane and 4,4'-, 2,4'- and/or 2,2'-methylenedicyclohexyl diisocyanate (H12MDI); particular preference is given to 4,4'-, 2,4'- and/or 2,2'-methylenedicyclohexyl diisocyanate (H12MDI) and 1-isocyanato-3,3,5-trimethyl-5-isocyanatomethylcyclohexane or mixtures thereof.

Accordingly, the present invention relates, according to a further embodiment, to a thermoplastic polyurethane as described above, where the polyisocyanate is selected from the group consisting of 4,4'-, 2,4'- and/or 2,2'-methylenedicyclohexyl diisocyanate (H12MDI), hexamethylene diisocyanate (HDI) and 1-isocyanato-3,3,5-trimethyl-5-isocyanatomethylcyclohexane or mixtures thereof.

According to the invention, the polyisocyanate can be used in pure form or in the form of a composition comprising the polyisocyanate and at least one solvent. Suitable solvents are known to the person skilled in the art. Of suitability are, for example, nonreactive solvents such as ethyl acetate, methyl ethyl ketone and hydrocarbons.

According to the invention, during the reaction of the at least one aliphatic polyisocyanate; the at least one chain extender; and the at least one polyol composition, further feed materials can be added, for example catalysts or auxiliaries and additives.

Suitable auxiliaries and additives are known per se to the person skilled in the art. Mention may be made, for example, of surface-active substances, flame retardants, nucleating agents, oxidation stabilizers, antioxidants, lubrication and mold release aids, dyes and pigments, stabilizers, e.g. against hydrolysis, light, heat or discoloration, inorganic and/or organic fillers, reinforcing agents and plasticizers. Suitable auxiliaries and additives can be found, for example, in the Kunststoffhandbuch [Plastics Handbook], volume VII, published by Vieweg and Höchtlen, Carl Hanser Verlag, Munich 1966 (pp. 103-113).

Suitable catalysts are likewise fundamentally known from the prior art. Suitable catalysts are, for example, organic metal compounds selected from the group consisting of tin, titanium, zirconium, hafnium, bismuth, zinc, aluminum and iron organyls, such as, for example, tin organyl compounds, preferably tin dialkyls such as tinII isooctoate, tin dioctoate, dimethyltin or diethyltin, or tin organyl compounds of aliphatic carboxylic acids, preferably tin diacetate, tin dilaurate, dibutyltin diacetate, dibutyltin dilaurate, titanic acid esters, bismuth compounds, such as bismuth alkyl compounds, preferably bismuth neodecanoate or the like, or iron compounds, preferably iron-(MI) acetylacetonate.

According to a preferred embodiment, the catalysts are selected from tin compounds and bismuth compounds, further preferably tinalkyl compounds or bismuthalkyl compounds. Of particular suitability are tinII isooctoate and bismuth neodecanoate.

The catalysts are usually used in amounts of from 3 ppm to 2000 ppm, preferably 10 ppm to 1000 ppm, further preferably 20 ppm to 500 ppm and at most preferably from 30 pmm to 300 ppm.

According to a further aspect, the present invention relates to a process for producing a thermoplastic polyurethane comprising the reaction
(i) of at least one aliphatic polyisocyanate;
(ii) of at least one chain extender; and
(iii) of at least one polyol composition,
where the polyol composition comprises a polyol selected from the group consisting of polyetherols and at least one bisphenol derivative selected from the group consisting of bisphenol A derivatives with a molecular weight Mw>315 g/mol and bisphenol S derivatives with a molecular weight Mw>315 g/mol, where at least one of the OH groups of the bisphenol derivative is alkoxylated.

Feed materials preferred according to the invention are described above.

Accordingly, the present invention relates, according to a further embodiment, to a process as described above for producing a thermoplastic polyurethane, where the chain extender and the bisphenol derivative are used in a molar ratio of 40:1 to 1:10.

Furthermore, the present invention relates, according to a further embodiment, to a process as described above for producing a thermoplastic polyurethane, where the at least one bisphenol derivative has the following general formula (I):

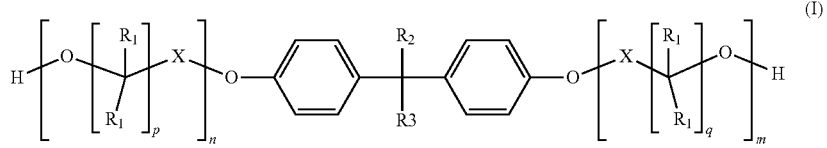

where
R1 is in each case independently of the others a methyl group or H.
R2 and R3 are a methyl group or
R2—C—R3 together are O=S=O,
X is a —C(R1)$_2$—, —C(R1)$_2$—C(R1)$_2$— or —C(R1)$_2$—C(R1)$_2$—C(R1)$_2$— group,
p and q independently of one another are an integer from 1 to 4, and
n and m independently of one another are an integer >0.

The present invention thus also relates to a process as described above for producing a thermoplastic polyurethane, where the polyol composition comprises a polyol selected from the group consisting of polyetherols. According to the invention, preferred polyetherols are polyethylene glycols, polypropylene glycols and polytetrahydrofurans.

Preferred feed materials are those described above. Also suitable quantitative ratios are described above.

The process can in principle be carried out under reaction conditions known per se.

According to a preferred embodiment, the process is carried out under higher temperatures than room temperature, further preferably in the range between 50° C. and 200° C., particularly preferably in the range from 65° C. to 150° C., in particular in the range from 75° C. to 120° C.

According to the invention, the heating can take place in any suitable manner known to the person skilled in the art, preferably by electrical heating, heating via heated oil or water, induction fields, warm air or IR radiation.

The thermoplastic polyurethanes according to the invention and/or the polyurethanes obtained by a process according to the invention have high transparency coupled with good mechanical properties. Surprisingly, discoloration does not arise even upon long UV exposure and thermal stress.

Thermoplastic polyurethanes according to the invention and/or the polyurethanes obtained by a process according to the invention preferably have a transmission at 450 nm of greater than 85% at a path length of 2 mm. The transmission or opacity here are measured in the context of the present invention once with a light trap as background and once with a white tile as background in reflection with the exclusion of gloss using a colorimeter. The lightness values (L value in accordance with DIN 6174) are compared and given as opacity in %.

The transmission or opacity was measured once with a light trap as background and once with a white tile as background in reflection with the exclusion of gloss using a colorimeter. The lightness values (L value in accordance with DIN 6174) are compared and given as opacity in %. The colorimeter used was "UltraScan" from HunterLab. The colorimeter is standardized upon reaching the operating temperature, generally 30 minutes, and run under the following parameters:

Mode: RSEX (Reflection Specular Excluded), reflection without gloss, with opening of the gloss trap
Area view: large
Port size: 25.4
UV filter: out The total opacity is calculated according to the following formula:

Opacity=(L value–black/L value–white)×100%

Accordingly, an opacity value of 0% means complete transparency (100%) of the sample and a value of 100% opacity means complete nontransparency (transparency=0%).

Further, the refractive index of the thermoplastic polyurethanes according to the invention or of the polyurethanes obtained by a process according to the invention is greater than 1.52, determined in accordance with EN ISO 489:1999.

Moreover, the thermoplastic polyurethane according to the invention or a polyurethane obtained by a process according to the invention is characterized in that the storage modulus within 40° C. drops to 5% of the starting value, measured in accordance with DIN ISO11359.

A further aspect of the present invention relates to the use of a transparent thermoplastic polyurethane according to the present invention or of a thermoplastic polyurethane obtainable by a process according to the present invention for producing extrusion products, films and moldings.

According to a further embodiment, the present invention relates to the use of a thermoplastic polyurethane as described above or of a thermoplastic polyurethane obtainable or obtained by a the use of a thermoplastic polyurethane as described above process for producing extrusion products, films and moldings.

According to a preferred embodiment, the use of a transparent thermoplastic polyurethane according to the present invention or of a thermoplastic polyurethane obtainable by a process according to the present invention comprises the production of a molding which is a lens, a screen, a display cover or cover for a headlight or a lamp.

Accordingly, the present invention relates, according to a further embodiment, to the use of a thermoplastic polyurethane as described above, where the molding is a lens, a screen, a display cover or cover for a headlight or a lamp.

Furthermore, the use of a thermoplastic polyurethane according to the present invention as glass substitute, thermoformable material, construction material, adhesive, in particular hot adhesive, medical equipment or as optical data carrier is preferred.

Particular preference is given to the use of a thermoplastic polyurethane according to the present invention as glass substitute, particularly in light guides, light-guiding films, lenses, Fresnel lenses, optical glasses, ophthalmic glasses, safety goggle glasses, headlight glasses, light covers, in particular in street lamps, reflex reflectors, automobile interior light glasses, motorcycle visors, covering glasses, housing coverings, in particular for automobile applications, safety screens, mobile phone displays, bottles and other containers.

Likewise preferred is the use of a thermoplastic polyurethane according to the present invention as optical data carrier, in particular for CDs, DVDs and BluRay compact disks, and also for further optical applications, for example under water.

Accordingly, the present invention relates, according to a further embodiment, to the use of a thermoplastic polyurethane as described above, where the products are transparent bodies for light guiding, for illumination or for the detection of light.

Further preference is given to the use of a thermoplastic polyurethane according to the present invention in medicine, in particular for medical equipment and as a material for implants.

Further embodiments of the present invention can be found in the claims and the examples. It is self-evident that the features specified above and illustrated below of the subject matter/process/uses according to the invention can be used not only in the combination given in each case, but also in other combinations, without departing from the scope of the invention. Thus, e.g. also the combination of a preferred feature with a particularly preferred feature, or a feature that is not further characterized with a particularly preferred feature etc., is implicitly comprised even if this combination is not expressly mentioned.

Exemplary embodiments of the present invention are listed hereinbelow, but these do not limit the present invention. In particular, the present invention also comprises those embodiments which arise from the back-references given below and therefore combinations.

1. Thermoplastic polyurethane obtainable or obtained by reaction of at least the components (i) to (iii):
   (i) at least one aliphatic polyisocyanate;
   (ii) at least one chain extender; and
   (iii) at least one polyol composition,
   where the polyol composition comprises at least one bisphenol derivative selected from the group consisting of bisphenol A derivatives with a molecular weight Mw>315 g/mol and bisphenol S derivatives with a molecular weight Mw>315 g/mol, where at least one of the OH groups of the bisphenol derivative is alkoxylated.
2. Thermoplastic polyurethane according to embodiment 1, where the chain extender is a diol with a molecular weight Mw<220 g/mol.
3. Thermoplastic polyurethane according to embodiment 1 or 2, where the chain extender and the bisphenol derivative are used in a molar ratio of 40:1 to 1:10.
4. Thermoplastic polyurethane according to one of embodiments 1 to 3, where the at least one bisphenol derivative has only primary OH groups.
5. Thermoplastic polyurethane according to one of embodiments 1 to 4, where the at least one bisphenol derivative has the following general formula (I):

where
   R1 is in each case independently of the others a methyl group or H,
   R2 and R3 are a methyl group or
   R2-C—R3 together are O=S=O,
   X is a —C(R1)$_2$—, —C(R1)$_2$—C(R1)$_2$— or —C(R1)$_2$—C(R1)$_2$—C(R1)$_2$— group,
   p and q independently of one another are an integer from 1 to 4, and
   n and m independently of one another are an integer >0.
6. Thermoplastic polyurethane according to one of embodiments 1 to 5, where the polyol composition comprises a polyol selected from the group consisting of polyetherols.
7. Thermoplastic polyurethane according to one of embodiments 1 to 6, where the polyol composition comprises a polyol selected from the group consisting of polytetrahydrofurans with a molecular weight Mn in the range from 600 g/mol to 2500 g/mol.
8. Thermoplastic polyurethane according to one of embodiments 1 to 7, where the polyisocyanate is an aliphatic diisocyanate.
9. Thermoplastic polyurethane according to one of embodiments 1 to 8, where the polyisocyanate is selected from the group consisting of 4,4'-, 2,4'- and/or 2,2'-methylenedicyclohexyl diisocyanate (H12MDI), hexamethylene diisocyanate (HDI) and 1-isocyanato-3,3,5-trimethyl-5-isocyanatomethylcyclohexane or mixtures thereof.
10. Process for producing a thermoplastic polyurethane comprising the reaction
    (i) of at least one aliphatic polyisocyanate;
    (ii) of at least one chain extender; and
    (iii) of at least one polyol composition,
    where the polyol composition comprises at least one bisphenol derivative selected from the group consisting of bisphenol A derivatives with a molecular weight Mw>315 g/mol and bisphenol S derivatives with a molecular weight Mw>315 g/mol, where at least one of the OH groups of the bisphenol derivative is alkoxylated.
11. Process according to embodiment 10, where the chain extender and the bisphenol derivative are used in a molar ratio of 40:1 to 1:10.
12. Process according to embodiment 10 or 11, where the at least one bisphenol derivative has the following general formula (I):

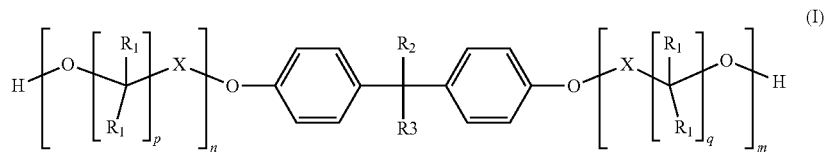

(I)

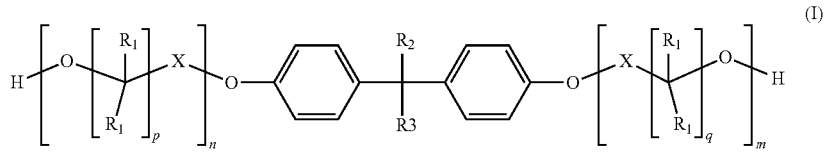

where
R1 is in each case independently of the others a methyl group or H.
R2 and R3 are a methyl group or
R2-C—R3 together are O=S=O,
X is a —C(R1)$_2$—, —C(R1)$_2$—C(R1)$_2$— or —C(R1)$_2$—C(R1)$_2$—C(R1)$_2$— group,
p and q independently of one another are an integer from 1 to 4, and
n and m independently of one another are an integer >0.

13. Process according to one of embodiments 10 to 12, where the polyol composition comprises a polyol selected from the group consisting of polyetherols.
14. Use of a thermoplastic polyurethane according to one of embodiments 1 to 9 or of a thermoplastic polyurethane obtainable or obtained by a process according to one of embodiments 10 to 13 for producing extrusion products, films and moldings.
15. Use according to embodiment 14, where the molding is a lens, a screen, a display cover or cover for a headlight or a lamp.
16. Use according to embodiment 14, where the products are transparent bodies for light guiding, for illumination or for the detection of light.
17. Thermoplastic polyurethane obtainable or obtained by reaction of at least the components (i) to (iii):
    (i) at least one aliphatic polyisocyanate;
    (ii) at least one chain extender; and
    (iii) at least one polyol composition,
    where the polyol composition comprises a polyol selected from the group consisting of polyetherols and at least one bisphenol derivative selected from the group consisting of bisphenol A derivatives with a molecular weight Mw>315 g/mol and bisphenol S derivatives with a molecular weight Mw>315 g/mol, where at least one of the OH groups of the bisphenol derivative is alkoxylated.
18. Thermoplastic polyurethane according to claim 17, where the chain extender is a diol with a molecular weight Mw<220 g/mol.
19. Thermoplastic polyurethane according to claim 17 or 18, where the chain extender and the bisphenol derivative are used in a molar ratio of 40:1 to 1:10.
20. Thermoplastic polyurethane according to one of claims 17 to 19, where the at least one bisphenol derivative has only primary OH groups.
21. Thermoplastic polyurethane according to one of claims 17 to 20, where the at least one bisphenol derivative has the following general formula (I):

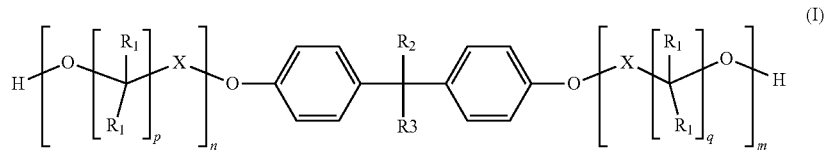

where
R1 is in each case independently of the others a methyl group or H,
R2 and R3 are a methyl group or
R2-C—R3 together are O=S=O,
X is a —C(R1)$_2$—, —C(R1)$_2$—C(R1)$_2$— or —C(R1)$_2$—C(R1)$_2$—C(R1)$_2$— group,
p and q independently of one another are an integer from 1 to 4, and
n and m independently of one another are an integer >0.

22. Thermoplastic polyurethane according to one of claims 17 to 21, where the polyetherol is selected from the group consisting of polyethylene glycols, polypropylene glycols and polytetrahydrofurans.
23. Thermoplastic polyurethane according to one of claims 17 to 22, where the polyol composition comprises a polyol selected from the group consisting of polytetrahydrofurans with a molecular weight Mn in the range from 600 g/mol to 2500 g/mol.
24. Thermoplastic polyurethane according to one of claims 17 to 23, where the polyisocyanate is an aliphatic diisocyanate.
25. Thermoplastic polyurethane according to one of claims 17 to 24, where the polyisocyanate is selected from the group consisting of 4,4'-, 2,4'- and/or 2,2'-methylenedicyclohexyl diisocyanate (H12MDI), hexamethylene diisocyanate (HDI) and 1-isocyanato-3,3,5-trimethyl-5-isocyanatomethylcyclohexane or mixtures thereof.
26. Process for producing a thermoplastic polyurethane comprising the reaction
    (i) of at least one aliphatic polyisocyanate;
    (ii) of at least one chain extender; and
    (iii) of at least one polyol composition,
    where the polyol composition comprises a polyol selected from the group consisting of polyetherols and at least one bisphenol derivative selected from the group consisting of bisphenol A derivatives with a molecular weight Mw>315 g/mol and bisphenol S derivatives with a molecular weight Mw>315 g/mol, where at least one of the OH groups of the bisphenol derivative is alkoxylated.
27. Process according to claim 26, where the chain extender and the bisphenol derivative are used in a molar ratio of 40:1 to 1:10.
28. Process according to claim 26 or 27, where the at least one bisphenol derivative has the following general formula (I):

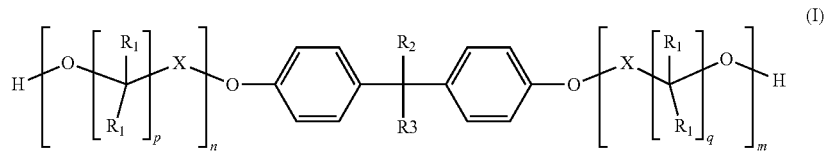

where
R1 is in each case independently of the others a methyl group or H,
R2 and R3 are a methyl group or
R2—C—R3 together are O=S=O,
X is a —C(R1)$_2$—, —C(R1)$_2$—C(R1)$_2$— or —C(R1)$_2$—C(R1)$_2$—C(R1)$_2$— group,
p and q independently of one another are an integer from 1 to 4, and
n and m independently of one another are an integer >0.

29. Process according to one of claims 26 to 28, where the polyetherol is selected from the group consisting of polyethylene glycols, polypropylene glycols and polytetrahydrofurans.

30. Use of a thermoplastic polyurethane according to one of claims 17 to 25 or of a thermoplastic polyurethane obtainable or obtained by a process according to one of claims 26 to 29 for producing extrusion products, films and moldings.

31. Use according to claim 30, where the molding is a lens, a screen, a display cover or cover for a headlight or a lamp.

32. Use according to claim 30, where the products are transparent bodies for light guiding, for illumination or for the detection of light.

The examples below serve to illustrate the invention but are in no way limiting as regards the subject matter of the present invention.

EXAMPLES

The following feed materials were used:
Polyol 1: polyetherpolyol with an OH number of 114.2 and exclusively primary OH groups
Polyol 2: bisphenol A-started polyetherpolyol with an OH number of 313 and exclusively primary OH groups
Polyol 3: bisphenol A-started polyetherpolyol with an OH number of 239 and exclusively primary OH groups
Polyol 4: adipic acid-DEG-TMP-started polyesterpolyol with MW 2390 g/mol and an OH number of 61 g/mol
Polyol 5: phthalic anhydride-DEG-started polyesterpolyol, with MW 356 and an OH number of 315 g/mol
Polyol 6: aromatic polyesterpolyol with MW 468 g/mol and an OH number of 240 g/mol
Isocyanate: aliphatic isocyanate (composition 100% 4,4'-methylenedicyclohexyl diisocyanate)
CE: 1,4-butanediol
Catalyst 1: bismuth neodecanoate
Catalyst 2: tinII isooctoate Examples The polyols were initially introduced in a container at 80° C. and mixed with the components according to Table 1 with vigorous stirring. The reaction mixture heated up to above 110° C. and was then poured onto a heated, Teflon-coated table. The resulting cast slab was heat-treated at 80° C. for 15 hours, then granulated and processed in injection molding.

The polyols 1, 2, 3, 4, 5 and 6 were reacted with chain extender CE and the isocyanate according to Table 1 below:

TABLE 1

|  | Example 1 (parts by weight) comparison | Example 2 (parts by weight) | Example 3 (parts by weight) | Example 4 (parts by weight) comparison | Example 5 (parts by weight) | Example 6 (parts by weight) | Example 7 (parts by weight) comparison |
|---|---|---|---|---|---|---|---|
| Polyol 1 | 39.61 | 32.51 | 22.54 | — | 31.60 | 21.00 | — |
| Polyol 2 | — | 5.12 | 12.42 | 28.93 | — | — | — |
| Polyol 3 | — | — | — | — | 6.53 | 15.18 | 32.32 |
| Isocyanate | 47.63 | 49.61 | 52.28 | 58.31 | 49.11 | 51.06 | 54.93 |
| CE | 12.76 | 12.76 | 12.76 | 12.76 | 12.76 | 12.76 | 12.76 |
| Catalyst | 70 ppm | 70 ppm | 70 ppm | 70 ppm | 70 ppm | 70 ppm | 70 ppm |

|  | Example 8 (parts by weight) | Example 9 (parts by weight) | Example 10 (parts by weight) | Example 11 (parts by weight) comparison | Example 12 (parts by weight) comparison |
|---|---|---|---|---|---|
| Polyol 1 | 20.23 | 18.59 | 17.19 | — | — |
| Polyol 3 | 30.35 | 27.89 | 26.48 | 47.36 | 40.2 |
| Isocyanate | 42.48 | 45.08 | 47.29 | 45.94 | 50.25 |
| CE | 6.93 | 8.44 | 9.73 | 6.69 | 9.55 |
| Catalyst 2 | 300 ppm | 300 ppm | 300 ppm | 300 ppm | 300 ppm |

|  | Example 13 (parts by weight) comparison | Example 14 (parts by weight) comparison | Example 15 (parts by weight) comparison | Example 16 (parts by weight) | Example 17 (parts by weight) comparison |
|---|---|---|---|---|---|
| Polyol 1 | 17.22 | 16.05 | 17.22 | 17.29 | — |
| Polyol 2 | — | — | — | — | — |

TABLE 1-continued

| | | | | | |
|---|---|---|---|---|---|
| Polyol 3 | — | — | — | 25.93 | 40.38 |
| Polyol 4 | 25.82 | — | — | — | — |
| Polyol 5 | — | 24.07 | — | — | — |
| Polyol 6 | — | — | 25.82 | — | — |
| Isocyanate | 47.27 | 50.19 | 42.27 | 47.07 | 50.67 |
| CE | 9.69 | 9.69 | 9.69 | 9.72 | 8.95 |
| Catalyst 2 | 200 ppm | 200 ppm | 200 ppm | 200 ppm | 200 ppm |

The following properties of the resulting polyurethanes were determined by the specified processes:

Hardness: DIN ISO 7619-1

Tensile strength and elongation at break: DIN 53504

Tear resistance: DIN ISO 34-1, B (b)

Yellowing index (reflection without gloss): ASTM E313

Vicat temperature: DIN EN ISO 306

Abrasion measurement: DIN ISO 4649

The results summarized in Table 2 were obtained:

TABLE 2

| Property | Dimension | Ex. 1 | Ex. 2 | Ex. 3 | Ex. 4 | Ex. 5 | Ex. 6 | Ex. 7 |
|---|---|---|---|---|---|---|---|---|
| Hardness | [Shore D] | 57 | 67 | 80 | 86 | 65 | 75 | 82 |
| Tensile strength | [MPa] | 40 | 28 | 52 | 28 | 45 | 40 | 66 |
| Elongation at break | [%] | 400 | 380 | 140 | 3 | 370 | 300 | 10 |
| Tear resistance | [kN/m] | 119 | 138 | 211 | 87 | 145 | 217 | 105 |
| Yellowing index | | 0.9 | 1.0 | 1.1 | 2.7 | 1.2 | 1.2 | 1.3 |
| Vicat temperature | 10 N/ 120° C./h [° C.] | 44 | 46.9 | 60.1 | 96.8 | 45.2 | 53.8 | 78.2 |
| Abrasion | [mm$^3$] | 90 | 243 | 106 | 146 | 176 | 108 | 106 |

| Property | Dimension | Ex. 8 | Ex. 9 | Ex. 10 | Ex. 11 | Ex. 12 |
|---|---|---|---|---|---|---|
| Hardness | [Shore D] | 72 | 74 | 77 | 83 | 82 |
| Tensile strength | [MPa] | 31 | 35 | 45 | 65 | 70 |
| Elongation at break | [%] | 290 | 250 | 190 | 30 | 30 |
| Tear resistance | [kN/m] | 142 | 201 | 233 | 43 | 157 |
| Yellowing index | | 2.0 | 1.8 | 1.4 | 1.6 | 1.0 |
| Abrasion | [mm$^3$] | n.d. | n.d. | n.d. | n.d. | n.d. |

| Property | Dimension | Ex. 13 | Ex. 14 | Ex. 15 | Ex. 16 | Ex. 17 |
|---|---|---|---|---|---|---|
| Hardness | [Shore D] | 74 | 78 | 61 | 75 | 82 |
| Tensile strength | [MPa] | 29 | 33 | 10 | 42 | 62 |
| Elongation at break | [%] | 100 | 20 | 230 | 250 | 70 |
| Tear resistance | [kN/m] | 27 | 24 | 73 | 208 | 133 |
| Yellowing index | | 3.2 | 2.8 | 3.1 | 2.2 | 1.4 |
| Abrasion | [mm$^3$] | n.d. | n.d. | n.d. | 107 | 104 | n.d.—not determinable

Determination of the Transmission/Opacity

The transmission or opacity was measured once using a light trap as background and once using a white tile as background in reflection with the exclusion of gloss using a colorimeter. The lightness values (L value in accordance with DIN 6174) are compared and given as opacity in %.

An "UltraScan" colorimeter from HunterLab was used. The samples are produced in accordance with AA E-10-132-002. The colorimeter is standardized upon reaching the operating temperature, generally 30 minutes, and run under the following parameters:

Mode: RSEX (Reflection Specular Excluded), reflection without gloss, with opening of the gloss trap Area view: large Port size: 25.4

UV filter: out

The total opacity is calculated according to the following formula:

$$\text{Opacity} = (L\text{ value–black}/L\text{ value–white}) \times 100\%$$

According to this, an opacity value of 0% means complete transparency (100%) of the sample and a value of 100% opacity means complete nontransparency (transparency=0%).

The invention claimed is:

1. A thermoplastic polyurethane obtained by reaction of at least the components (i) to (iii):
   (i) at least one aliphatic polyisocyanate;
   (ii) at least one chain extender; and
   (iii) at least one polyol composition,
   wherein the polyol composition comprises both a) and b):
     a) at least one polyol selected from the group consisting of at least one polyetherol, and
     b) at least one bisphenol derivative, which is a bisphenol A derivative with a molecular weight Mw>315 g/mol, where at least one OH group of the bisphenol derivative is alkoxylated,
   wherein the polyetherol is selected from the group consisting of a polyethylene glycol, a polypropylene glycol, a polytetrahydrofuran, and a mixture thereof,
   wherein the chain extender and the bisphenol derivative are used in a molar ratio of 20:1 to 1:1, and
   wherein the thermoplastic polyurethane has a transmission at 450 nm of greater than 85% at a path length of 2 mm.

2. The thermoplastic polyurethane according to claim 1, wherein the chain extender is a diol with a molecular weight Mw<220 g/mol.

3. The thermoplastic polyurethane according to claim 1, wherein the at least one bisphenol derivative has only primly OH groups.

4. The thermoplastic polyurethane according to claim 1, wherein the at least one bisphenol derivative has formula (I):

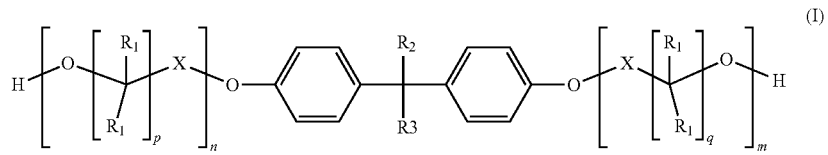

wherein:
R1 is in each case independently of the others a methyl group or H,
R2 and R3 are a methyl group,
X is a —C(R1)$_2$—, —C(R1)$_2$—C(R1)$_2$— or —C(R1)$_2$—C(R1)$_2$—C(R1)$_2$— group,
p and q independently of one another are an integer from 1 to 4, and
n and m independently of one another are an integer >0.

5. The thermoplastic polyurethane according to claim 1, wherein the polyol composition comprises at least one polyol selected from the group consisting of a polytetrahydrofuran with a molecular weight Mn in the range from 600 g/mol to 2500 g/mol.

6. The thermoplastic polyurethane according to claim 1, wherein the aliphatic polyisocyanate is an aliphatic diisocyanate.

7. The thermoplastic polyurethane according to claim 1, wherein the aliphatic polyisocyanate is selected from the group consisting of 4,4'-, 2,4'- and/or 2,2'-methylenedicyclohexyl diisocyanate (H12MDI), hexamethylene diisocyanate (HDI) and 1-isocyanato-3,3,5-trimethyl-5-isocyanatomethylcyclohexane, and a mixture thereof.

8. A process for producing a thermoplastic polyurethane, the process comprising:
reacting
(i) of at least one aliphatic polyisocyanate;
(ii) of at least one chain extender; and
(iii) of at least one polyol composition,
wherein the polyol composition comprises both a) and b):
a) at least one polyol selected from the group consisting of at least one polyetherol and
b) at least one bisphenol derivative, which is a bisphenol A derivative with a molecular weight Mw>315 g/mol, where at least one OH group of the bisphenol derivative is alkoxylated,
wherein the polyetherol is selected from the group consisting of a polyethylene glycol, a polypropylene glycol, a polytetrahydrofuran, and a mixture thereof,
wherein the chain extender and the bisphenol derivative are used in a molar ratio of 20:1 to 1:1, and
wherein the thermoplastic polyurethane has a transmission at 450 nm of greater than 85% at a path length of 2 mm.

9. The process according to claim 8, wherein the at least one bisphenol derivative has formula (I):

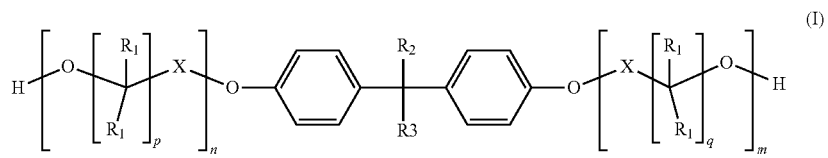

wherein:

R1 is in each case independently of the others a methyl group or H,

R2 and R3 are a methyl group,

X is a —C(R1)$_2$—, —C(R1)$_2$—C(R1)$_2$— or —C(R1)$_2$—C(R1)$_2$—C(R1)$_2$— group, p and q independently of one another are an integer from 1 to 4, and n and m independently of one another are an integer >0.

10. A process of making an extrusion product, a film, or a molding, the process comprising:

forming a thermoplastic polyurethane according to claim 1 into an extrusion product, a film, or a molding.

11. The process according to claim 10, wherein said molding is a lens, a screen, a display cover or cover for a headlight or a lamp.

12. The process according to claim 10, where said extrusion product is a transparent body for light guiding, for illumination or for the detection of light.

13. A process of making an extrusion product, a film, or a molding, the process comprising:

forming a thermoplastic polyurethane obtained by a process according to claim 8 into an extrusion product, a film, or a molding.

14. The process according to claim 13, wherein said molding is a lens, a screen, a display cover or cover for a headlight or a lamp.

15. The process according to claim 13, where said extrusion product is a transparent body for light guiding, for illumination or for the detection of light.

* * * * *

UNITED STATES PATENT AND TRADEMARK OFFICE
CERTIFICATE OF CORRECTION

PATENT NO.         : 10,611,872 B2
APPLICATION NO.    : 15/034116
DATED              : April 7, 2020
INVENTOR(S)        : Frank Prissok et al.

Page 1 of 1

It is certified that error appears in the above-identified patent and that said Letters Patent is hereby corrected as shown below:

In the Specification

In Column 1, Lines 53-54, delete "1,4-di(g-hydroxyethyl)bisphenol A." and insert -- 1,4-di(β-hydroxyethyl)bisphenol A. --

In Column 2, Line 3, delete "alkoxyated" and insert -- alkoxylated --

In Column 4, Line 25, delete "alkoy groups." and insert -- alkoxy group. --

In Column 5, Line 25, delete "H." and insert -- H, --

In Column 5, Line 44, delete "H." and insert -- H, --

In Column 8, Line 48, delete "pmm" and insert -- ppm --

In Column 9, Line 17, delete "H." and insert -- H, --

In Column 10, Line 40, delete "a the" and insert -- the --

In Column 13, Line 11, delete "H." and insert -- H, --

In the Claims

In Column 18, Line 66, Claim 3, delete "primly" and insert -- primary --

Signed and Sealed this
Fourth Day of August, 2020

Andrei Iancu
*Director of the United States Patent and Trademark Office*